(12) United States Patent
Liebenow (10) Patent No.: US 7,665,078 B2
(45) Date of Patent: Feb. 16, 2010

(54) HUFFMAN-L COMPILER OPTIMIZED FOR CELL-BASED COMPUTERS OR OTHER COMPUTERS HAVING RECONFIGURABLE INSTRUCTION SETS

(75) Inventor: Frank Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 1073 days.

(21) Appl. No.: 10/646,282

(22) Filed: Aug. 21, 2003

(65) Prior Publication Data

US 2005/0044539 A1 Feb. 24, 2005

(51) Int. Cl.
G06F 9/45 (2006.01)
(52) U.S. Cl. ................... 717/152; 717/154; 717/160
(58) Field of Classification Search ............ 717/140, 717/151–154, 158–161
See application file for complete search history.

(56) References Cited

U.S. PATENT DOCUMENTS

| | | | | |
|---|---|---|---|---|
| 4,763,255 A * | 8/1988 | Hopkins et al. | ............ | 717/153 |
| 5,361,373 A * | 11/1994 | Gilson | ............ | 712/1 |
| 5,655,122 A | 8/1997 | Wu | | |
| 5,905,893 A * | 5/1999 | Worrell | ............ | 717/151 |
| 6,141,742 A | 10/2000 | Favor | | |
| 6,263,429 B1 * | 7/2001 | Siska | ............ | 712/245 |
| 6,345,384 B1 | 2/2002 | Sato | | |
| 6,408,382 B1 * | 6/2002 | Pechanek et al. | ............ | 712/227 |
| 6,457,173 B1 * | 9/2002 | Gupta et al. | ............ | 717/149 |
| 6,701,515 B1 * | 3/2004 | Wilson et al. | ............ | 717/117 |
| 6,718,539 B1 * | 4/2004 | Cohen et al. | ............ | 717/136 |
| 6,865,668 B1 * | 3/2005 | Benes et al. | ............ | 712/300 |
| 7,051,189 B2 * | 5/2006 | Warnes | ............ | 717/151 |
| 2003/0041320 A1 * | 2/2003 | Sokolov | ............ | 717/152 |
| 2005/0028132 A1 * | 2/2005 | Srinivasamurthy et al. | .. | 717/100 |

OTHER PUBLICATIONS

"Generation of fast interpreters for Huffman compressed bytecode", Latendresse et al., Jun. 2003, pp. 32-40. Online retrieved at <http://delivery.acm.org/10.1145/860000/858574/p32-latendresse.pdf>.*
"Three extensions to register integration", Petric et al., Nov. 2002, pp. 37-47. Online retrieved at <http://delivery.acm.org/10.1145/780000/774866/p37-petric.pdf>.*
"Efficient instruction encoding for automatic instruction set design of configurable ASIPs", Lee et al., Nov. 2002, pp. 649-654. Online retrieved at <http://delivery.acm.org/10.1145/780000/774668/p649-lee.pdf>.*
"Register allocation for irregular architectures", Scholz et al., Jul. 2002, pp. 139-148. Online retrieved at <http://delivery.acm.org/10.1145/520000/513854/p139-scholz.pdf>.*

* cited by examiner

Primary Examiner—Tuan Q Dam
Assistant Examiner—Thuy Dao
(74) Attorney, Agent, or Firm—Pearne & Gordon LLP (57) ABSTRACT

A method for optimizing a code sequence by tuning the representations of an instruction set based on the frequency of operations performed by the code sequence. For example, the number of bit symbols used to represent a code sequence may be reduced using the present invention.

44 Claims, 7 Drawing Sheets

HUFFMAN-L COMPILER OPTIMIZED FOR CELL-BASED COMPUTERS OR OTHER COMPUTERS HAVING RECONFIGURABLE INSTRUCTION SETS

FIELD OF THE INVENTION

The present invention generally relates to the field of computer language translators, and particularly to a compiler which optimizes the machine code generated through use of Huffman encoding principles.

BACKGROUND OF THE INVENTION

New computer processor technologies include processors with reconfigurable instructions sets. Thus, while the steps performed by each instruction may be the same (but not necessarily) or similar, the representation of those instructions is programmable. This enables these processors with the ability to use the instruction sets for programs having various source languages (FORTRAN, BASIC, C, C++). The use of compilers to generate assembly code (target or object language) from the instruction set of the program code (source language) is well known. A compiler is a computer program that reads a program in one language (source language) and translates it into an equivalent program in another language (assembly, target or object language).

Currently, many optimization techniques, in order to generate assembly code capable of more efficiently executing program routines, are known in the art. U.S. Pat. No. 6,141,742 teaches a plurality of variable length instructions and a method of decoding such. U.S. Pat. No. 6,145,184 teaches an optimization technique involving a plurality of fixed instruction sets from which to choose from. The instruction sets are prioritized based on the memory space and cycle counts needed to perform them. U.S. Pat. No. 5,655,122 teaches optimization of a program by arranging the object code in memory based on branch probabilities, branch frequencies, and function frequencies.

It is also known in the art to utilize Huffman encoding principles for providing bit-symbol representations of data, such as text. In the Huffman system, data symbols that occur with greater frequency are assigned shorter bit patterns to represent them. For example, encoding English text, the letter 'e' would be assigned a two-bit symbol and the letter 'z' would be assigned a 16-bit symbol. This has proven to reduce transmission and storage requirements over sending a fixed number of bits per symbol (e.g., 7 bits each).

Many of the currently employed optimization techniques use factors, such as memory space occupied and cycle time in determining operational priority. Unfortunately, the currently employed optimization techniques employed fail to provide a method, apparatus, or system for optimization of the instruction sets to be executed, in determining operational priority.

Therefore, it would be desirable to provide a method, apparatus, and system which enable the optimization of the program code to be executed by a processor by applying Huffman-like encoding principles to prioritize the instructions and instruction sets to be used and performed.

SUMMARY OF THE INVENTION

Accordingly, the present invention provides a method, apparatus, and system for optimized processor performance by utilizing a compiler enabled to optimize the instruction sets needed to execute a program code. It will be understood by those of ordinary skill in the art that the terms "program code", "code sequence", "instruction sequence", and "operation sequence" are interchangeable and equivalent. The optimization of the instruction sets allows those instructions most frequently used to be executed by the processor using the smallest memory space and cycle time. In one aspect of the present invention, the optimization involves prioritizing individual instructions by assigning the most frequently used instructions the smallest number of bit-symbols for identification and execution by the processor. The highest priority instructions have the fewest number of bits in their bit-symbol representations. The processor's instruction decoder is then reconfigured to recognize the new instruction set. Thus, when instructions are loaded into a memory space or the like for execution by a processor they occupy the least amount of memory space. This may enable the processor to execute the instructions using a smaller cycle time. Further, it may enable the processor to load a greater number of instructions into available memory space, perhaps cache memory, thereby improving performance for both the execution and paging of the resulting program.

It is an object of the present invention to utilize loop-analysis techniques in the enabling of optimization of the instructions executed. For example, in determining and then prioritizing the most frequently used instructions, a representation of the frequency of operations performed, which may be similar in content and organization to a histogram, being a frequency distribution of operations and frequencies may take into account instructions that occur within loops that may be executed multiple times. This enables the present invention to ensure that the order of execution of one or more instruction sequences, containing dependency on one or more individual instructions, receives priority during the development of the frequency distribution.

In another aspect of the present invention, optimization involves the optimizing of instruction sets available to the processor, which may be used to execute the program code. In this aspect, a plurality of pre-determined instruction sets are made available to the processor. The instruction set which may be most frequently used to perform operations and provides the most optimized instructions, is selected. In this way the operations of the program code are performed by those sets of instructions which execute the most relevant instructions using the smallest amount of memory space and fewest number of clock cycles.

In another aspect of the present invention, an optimization technique provides for the prioritization of the most frequently used registers within a sequence of instructions. In such an instance, the target code, which identifies register(s) used by the instruction sequence, is Huffman-like encoded so that a reference to the most used registers would require a smaller number of bits than a reference to a less frequently used register. For example, a register used more frequently may be assigned a two bit representation and a register used less frequently may be assigned bit representations requiring more than four bit symbols.

In another aspect of the present invention, an optimization technique provides for the development of an instruction set for execution of a program code based on the number of registers needed to execute the operations. For example, in a processor where there are many registers available the compiler may determine how many registers are needed and develop an instruction set around that. For example, if 32 registers are available and a given program requires less than 9 registers, each register used by the program can be represented using three bits instead of five bits which would be required to represent 32 registers. In this example, an instruction that operates on two registers, such as a move registerto-register, could be represented with four less bits. Thus, the target codes of instructions may be compiled with a reduced bit symbol representation due to the limited number of registers being used.

In a still further aspect of the present invention, an optimization technique provides for the development of an instruction set for execution of a program code based on a determination of instructions executed. In this method of optimization bit-pattern representations are reserved for only those instructions executed by the program code in performance of operations.

In an aspect of the present invention, an optimized compiler is provided which utilizes Huffman-like encoding principles in order to optimize instruction sets needed to execute a given program. The optimized compiler being capable of executing the methods mentioned/discussed in previous aspects. For example, once intermediate code, called p-code, has been generated, the compiler scans this code to develop a frequency distribution representing the frequency of operations. Then, the compiler may tune the instruction set to use shorter instructions to represent more frequently used operations. Alternately, the compiler may have a set of pre-determined instruction sets that can be selected based on a frequency of operations. For example, one instruction set may be optimized for math functions, one for Boolean functions, one for data movement and manipulation, one for input/output, and the like.

In an additional aspect of the present invention, a system is provided for optimizing processor performance through use of an optimized compiler which generates compressed object files of variable length based on a distribution of a frequency of operations. The system may include any information handling system, such as a computing system, networked system (i.e., an intranet, an internet, the Internet, World Wide Web), and the like.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown.

Figure 1:
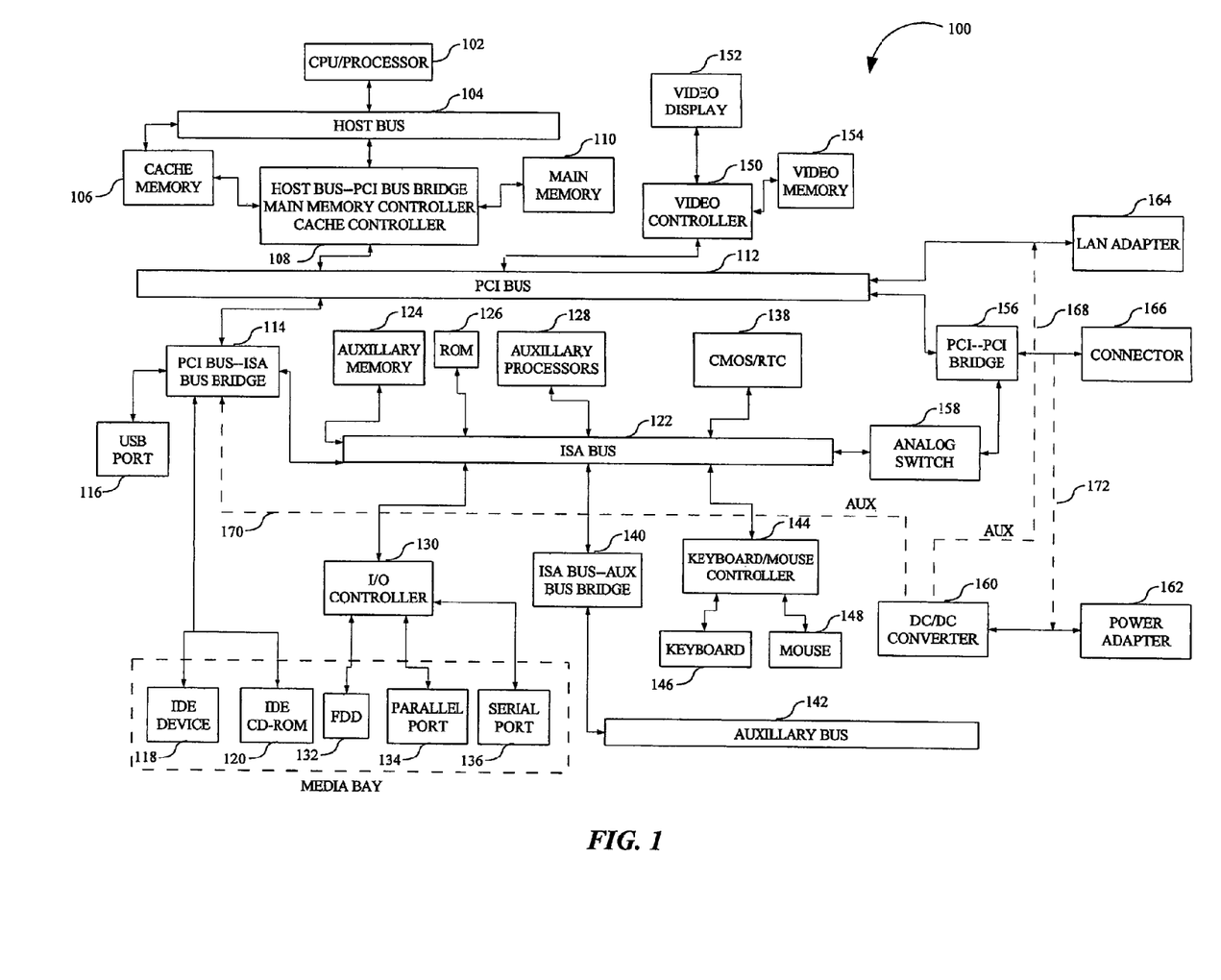
FIG. 1 is an illustration of an exemplary system within which the present invention may be located in accordance with an exemplary embodiment of the present invention.

In a preferred embodiment, the present invention may be implemented as programs of instructions resident in a memory within one or more computer systems or servers configured generally as described in FIG. 1. Until required by the computer system or server, the set of instructions may be stored in another readable memory device, for example, in a hard disk drive or in a removable memory such as an optical disk for utilization in a CD-ROM drive or a DVD drive, a floppy disk for utilization in a floppy disk drive, a personal computer memory card for utilization in a personal computer card slot, or the like. Further, the program of instructions can be stored in the memory of another computer system or server and transmitted over a local area network or a wide area network, such as the Internet, an internet, an intranet, or the like, when desired by the user. Additionally, the instructions may be transmitted over a network in the form of an applet or the like that is interpreted or compiled after transmission to the computer system or server rather than prior to transmission. One skilled in the art may appreciate that the physical storage of the sets of instructions, applets, or the like physically changes the medium upon which it is stored electrically, magnetically, chemically, physically, optically or holographically so that the medium carries computer readable information.

Referring now to FIG. 1, an exemplary hardware system 100 generally representative of an information handling system, such as a computer, sold or leased to host customers in accordance with the present invention is shown. For example, the computer may be a desktop personal computer (PC), a notebook PC, and the like. The hardware system 100 is controlled by a central processing system 102 (CPU). The central processing system 102 includes a central processing unit such as a microprocessor or microcontroller for executing programs, performing data manipulations and controlling the tasks of the hardware system 100. Communication with the central processor 102, by hardware components described later, is implemented through a high speed host bus 104. It is contemplated that the bus 104 may include a data channel for facilitating information transfer between storage and other peripheral components of the hardware system. The bus 104 may further provide the set of signals required for communication with the central processing system 102 including a data bus, address bus, and control bus.

In the preferred embodiment, the high speed host bus 104 connects with these hardware components through its pins, such as a PCI bus 112, an ISA bus 122, and an auxiliary bus 142. These buses provide for the transferring of information among the components of the hardware system 100.

In the current embodiment, a Host Bus—PCI Bus (HPCI) bridge circuit 108 enables communication between the host bus 104 and the PCI bus 112. In the current embodiment, the HPCI 108 includes a main memory controller and a cache controller. The main memory controller allows the HPCI 108 to control an operation for accessing main memory 110. This is accomplished by enabling the main memory controller with logic for mapping a ddresses to and from the CPU 102 to particular areas of the main memory 110. It is known that data transfer speeds differ between buses. Thus, the HPCI 108 further acts as a buffer to absorb any data transfer speed differences between the host bus 104 and the PCI bus 112.

The main memory 110 is a volatile random access memory (RAM) composed of a plurality of memory modules, typically DRAM (Dynamic RAM) chips. Other semi-conductor-based memory types which may be employed with the hardware system 100 may include, for example, synchronous dynamic random access memory (SDRAM), Rambus dynamic random access memory (RDRAM), ferroelectric random access memory (FRAM), and so on. The main memory 110 provides storage of instructions and data for programs executing on the central processing system 102. The programs to be executed by the CPU 102 include device drivers that access an operating system (OS) such as Windows 2000 or the like and peripheral devices, application program for specified jobs, and firmware stored in a ROM 126 (described later). The memory capacity of the RAM may vary greatly, for example, ranging from 12 MB, to 64 MB, to 256 MB, to 512 MB. It is understood that the specific configuration of the main memory 110 may vary as contemplated by one of ordinary skill in the art.

A cache memory 106 is connected to the host bus 104 and the HPCI bridge 108. Cache memory is high-speed memory for temporary storage of limited amounts of code and data that the CPU 102 frequently accesses. The cache 106 operates to absorb the time required by the CPU 102 to access the main memory. In a preferred embodiment, the cache 106 may be implemented as an L-2 cache consisting of SRAM (Static RAM) chips, or the like with memory capacity as contemplated by one of ordinary skill in the art.

The buses 104, 112, 122, and 142, may comprise any state of the art bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 411 general-purpose interface bus (GPIB), IEEE 696/S-100, and so on.

In the preferred embodiment, the PCI bus 112 provides a relatively fast data transfer rate and directly communicates with devices such as the video controller 150. The video controller 150 couples with the video memory 154 and a video display 152. Graphic commands or the like are received from the CPU 102 by the video controller 150. The commands are processed and then temporarily stored in the video memory 154 before being output as graphics upon the video display 152. Common to video controllers is a digital to analog converter which converts a video signal to an analog signal. The analog signal may be output through CRT ports or other communication assemblies, such as LAN docking connectors, and the like. Video memory 154 may be, for example, video random access memory (VRAM), synchronous graphics random access memory (SGRAM), windows random access memory (WRAM), and the like. The video display 152 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission) display, a plasma-addressed liquid crystal (PALC) display, a high gain emissive display (HGED), and so forth.

Other devices such as card bus controllers and the like are also typically in direct communicative contact with the PCI bus. PCI card slots are commonly found on many computers being formed in the wall or face of the computer. PC cards which conform to certain industry standards, such as those determined by the PCMCIA or JEIDA, may be used within these slots. Card bus controllers directly transmit PCI bus signals to the interface connector of a PCI card slot.

In situations where the PCI bus 112 is being tasked to interconnect with a secondary PCI bus, downstream of the PCI bus 112, a bridge circuit may be provided. In the current embodiment that bridge circuit may be identified as PCI—PCI bridge 156. An example of when this functionality may be needed is when the system 100 is a notebook computer. The notebook computer may use connector 166 to dock with and communicate with an expansion station. The expansion station may include a PCI bus as part of its hardware arrangement and connection between it and the PCI bus 112 may be enabled through the PCI—PCI Bridge 156. When a secondary PCI bus is not connected downstream, the bridge 156 may be disabled by disabling the PCI bus 112 signals at the end of the PCI bus 112. The connector 166 may be enabled as a communication subsystem and while shown coupled with the PCI bus 112 it may also couple with the ISA bus 122 for allowing the system 100 to communicate with a remote information handling system.

The present embodiment shows that the PCI bus 112 is coupled with the ISA bus 122 via a PCI Bus—ISA Bus Bridge (PCISA) 114. The PCISA 114 includes a USB route controller for connecting a USB port 116. USB devices, such as a digital camera, MP-1, tablet, mouse, and the like, may be inserted and removed from the USB port 116 while the system 100 is operating, and the hardware system 100 may provide a plug-and-play capability for reconfiguring the system configuration once a USB device has been identified. The USB router controller may further enable the operation of a peripheral USB and a general purpose bus. The PCISA 114 additionally includes an IDE (Integrated Drive Electronics) interface. This interface connects external storage devices that conform to the IDE specifications. In this manner data transfer between an IDE device 118 and the main memory 110 may occur without passing through the CPU 102. IDE device 118 may include DVD drives, HDD (hard disk drives), and the like. An IDE CD-ROM 120 is also connected with the IDE interface, preferably using an ATAPI (AT Attachment Packet Interface). The IDE device 118 and IDE CD-ROM 120 are typically located in a "media bay" of the computer. This "media bay" is usually situated for interaction by a user with its various components, which makes using the various devices easier. Other devices, which will be discussed later, may also be included within the "media bay".

The PCI bus 112 and the ISA bus 122 are connected by the PCISA Bridge 114 allowing communication between those devices coupled with the ISA bus 122 and the CPU 102, when needed. The PCISA Bridge 114 includes power management circuitry which is coupled via AUX II with a power adapter 162 that brings power in from a power supply to the system 100. The power management circuitry allows the hardware system 100 to change between various power states, such as normal operating state, off, suspend, and the like. Enough power is supplied to the hardware system 100 so that when it is in the off or suspend state, the hardware system 100 can monitor for events which cause the system 100 to be reenabled. In the present embodiment the power management circuitry is also enabled as a controller for the auxiliary bus 142 coupled through an ISA bus—AUX bus bridge 140 to the ISA bus 122. The ISA bus—AUX bus bridge 140 is a low speed bus, and it is contemplated that the auxiliary bus 142 may be enabled as a system management (SM) bus for enabling the functioning of a LAN adapter 164 (both the SM bus and LAN adapter will be discussed later). The power management circuitry may be further enabled as a programmable interval timer (PIT) which is configurable by a user to expire after a predetermined period of time. For example, when the timer expires, the hardware system 100 will change from the off state to the normal operating state. It is further contemplated that the PCISA Bridge 114 may include a DMA controller and a programmable interrupt controller (PIC). The DMA controller may be used for performing a data transfer between a peripheral device and the main memory 110 that the data does not pass through the CPU 102. The PIC may execute a program (an interrupt handler) in response to an interrupt request from a peripheral device to which it is coupled.

The ISA bus 122 connects with an auxiliary memory 124, ROM 126, auxiliary processors 128, a CMOS/RTC 138 (CMOS=Complementary Metal Oxide Semiconductor), an I/O controller 130, the ISA bus—AUX bus bridge 140, a keyboard/mouse controller 144, and an analog switch 158. Typically, the ISA bus 122 transfers data at a lower speed than the PCI bus 112. The auxiliary memory 124 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 124 may also include a variety of non-semiconductor-based m emories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The auxiliary memory 124 may provide a variety of functionalities to the hardware system 100, such as the storage of instructions and data that are loaded into the main memory 110 before execution. In this way, the auxiliary memory 124 acts in a very similar manner to the ROM 126, described below.

The ROM 126 is a non-volatile memory for the permanent storage of a code group, such as a BIOS (Basic Input/Output System) or the like having input and output signals for hardware components, such as a floppy disk drive (FDD) 132, a keyboard 146, and a mouse 148. Additionally the ROM provides for the permanent storage of firmware, such as a test program like a POST (Power on Self Test) or the like that is run when the hardware system 100 is first powered on. It is understood that the hardware system 100 may include both the auxiliary memory 124 and the ROM 126 or be enabled with only one of these memory devices without departing from the scope and spirit of the present invention.

The hardware system 100 includes an auxiliary processing system 128 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that the system 100 may employ such auxiliary processors as discrete processors, processors built in to the main processor, or may not include such processors at all.

The CMOS/RTC 138 is a chip which includes an RTC (real time clock) which is used for time of day calculations and the CMOS memory. The CMOS memory is typically used to store information, such as BIOS setup values, passwords, and vital parts of a system configuration.

The I/O controller 130 provides interface functionality between the one or more I/O devices 132-136 and the ISA bus 122. I/O devices include FDD 132, Parallel Port 132, and a Serial Port 136, in the present embodiment. It is contemplated that the I/O controller 112 may interface with the universal serial bus (USB) port 116, an IEEE 1194 serial bus port, infrared port, network adapter, printer adapter, radio-frequency (RF) communications adapter, universal asynchronous receiver-transmitter (UART) port, and the like. Further, it is contemplated that the I/O controller 130 may provide for the interfacing between corresponding I/O devices such as the keyboard 146, the mouse 148, trackball, touchpad, joystick, trackstick, infrared transducers, printer, modem, RF modem, bar code reader, charge-coupled device (CCD) reader, scanner, compact disc (CD) drive, compact disc read-only memory (CD-ROM) drive 120, digital versatile disc (DVD) drive, video capture device, TV tuner card, touch screen, stylus, electroacoustic transducer, microphone, speaker, audio amplifier, and the like. The I/O controller 130 and I/O devices 132-136 may provide or receive analog or digital signals for communication between the hardware system 100 of the present invention and external devices, networks, or information sources. The I/O controller 130 and I/O devices 132-136 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 100 of FIG. 1 by one having ordinary skill in the art would not depart from the scope or the spirit of the present invention.

In the preferred embodiment, the keyboard/mouse controller 144 is enabled for fetching input provided through use of the keyboard 146 and/or the mouse 148. In an alternative embodiment, it is contemplated that the functionality performed by the keyboard/mouse controller 144 may reside in the I/O controller 130. Other controllers, such as an audio signal controller for processing the input/output of audio signals may be included within the hardware system 100. An analog switch 158 couples the ISA bus 122 with the connector 166. The analog switch 158, responding to whether or not a secondary PCI bus is connected with the hardware system 100, weakens the signal at the end of the ISA bus 122 and disconnects the ISA bus 122 from the connector 166.

A power adapter 162 for transforming an external AC power source into a DC voltage is coupled with a DC/DC converter 160. The DC/DC converter 160 provides a stable DC voltage to the components of the hardware system 100. It is contemplated that power may be received via the connector 166 by the DC/DC converter 160 and then reduced and stabilized for use by the hardware system 100. In this case, the power is carried along a power feed line 172 to the DC/DC converter 160. The PCISA Bridge 114 is supplied with auxiliary power via a power feed line 170 from the DC/DC converter 160. A LAN adapter 164 (described later) receives auxiliary power via a power feed line 168 from the DC/DC converter 160. This auxiliary power source may be required when the system 100 is enabled in an "off" state. For example, when the hardware system 100 is "off" the PCISA Bridge 114 may need to monitor the hardware system 100 for events which may cause the hardware system 100 to be re-enabled. In the LAN adapter 164, auxiliary power may be required for scanning all inputs received from the LAN. The LAN adapter 164 may scan for a particular data frame coupled with the input from the LAN and, if the data frame is not found refuse the input. If the data frame is found, the LAN adapter 164 may alert (i.e., WOL) the PCISA Bridge 114, including the power management circuitry, to power the hardware system 100 to a normal operating state.

While the hardware system 100 will be referenced during description of the present invention, it is understood that the configuration of the hardware system 100 may be varied, as contemplated by one of ordinary skill in the art, without departing from the scope and spirit of the present invention. For example, the type of CPU/Processor used may vary and the type and number of controllers, busses, and devices connected to the CPU/Processor may also vary.

In the present invention, a method of optimizing the representation of a code sequence is shown in FIGS. 2 through 5. It is understood that the methods shown and described, may preferably be implemented via a compiler or other machine code generator, such as an assembler, translator, and the like. A compiler being a program executable upon the processor of a computer which reads a program in one language and then translates the program into another language. The present invention, through use of the compiler, provides a Huffman-like compression to bit symbol representations for instructions within an instruction set executed by the program. The Huffman-like compression provides improved memory usage and improved performance of the resulting executable.

Figure 6:
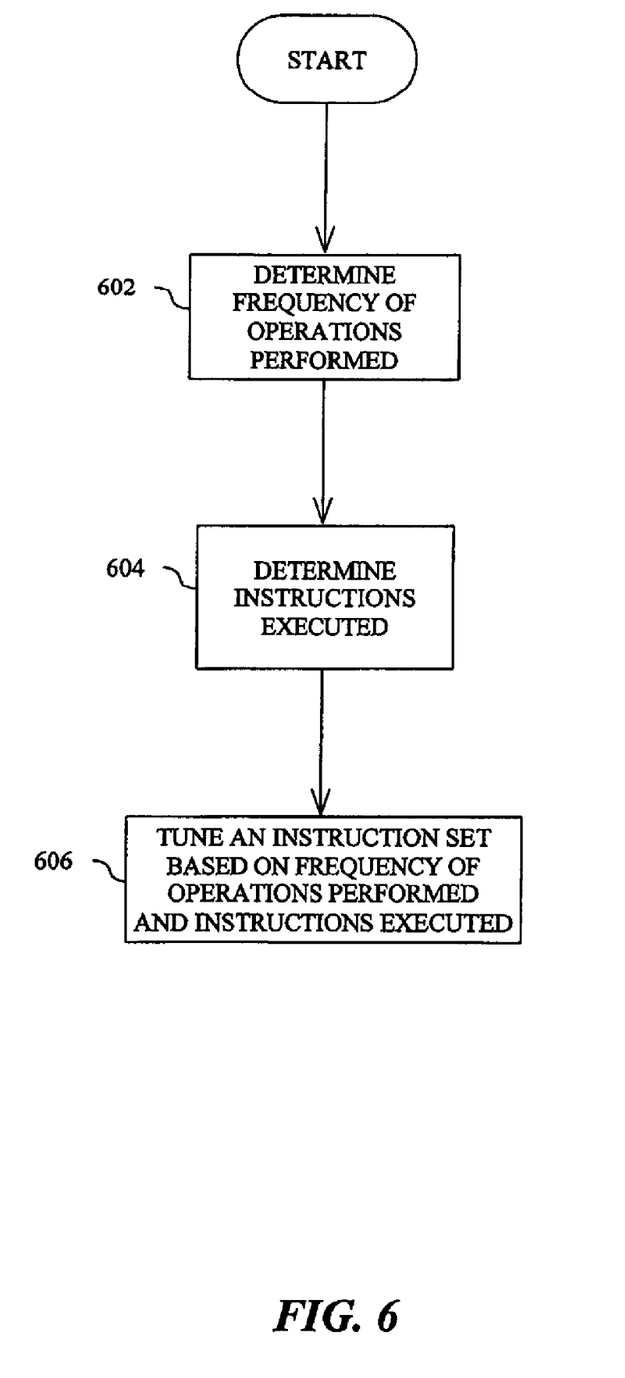
FIG. 6 is a diagrammatic representation of the functional steps performed by a fifth exemplary embodiment of the present invention.
Figure 7:
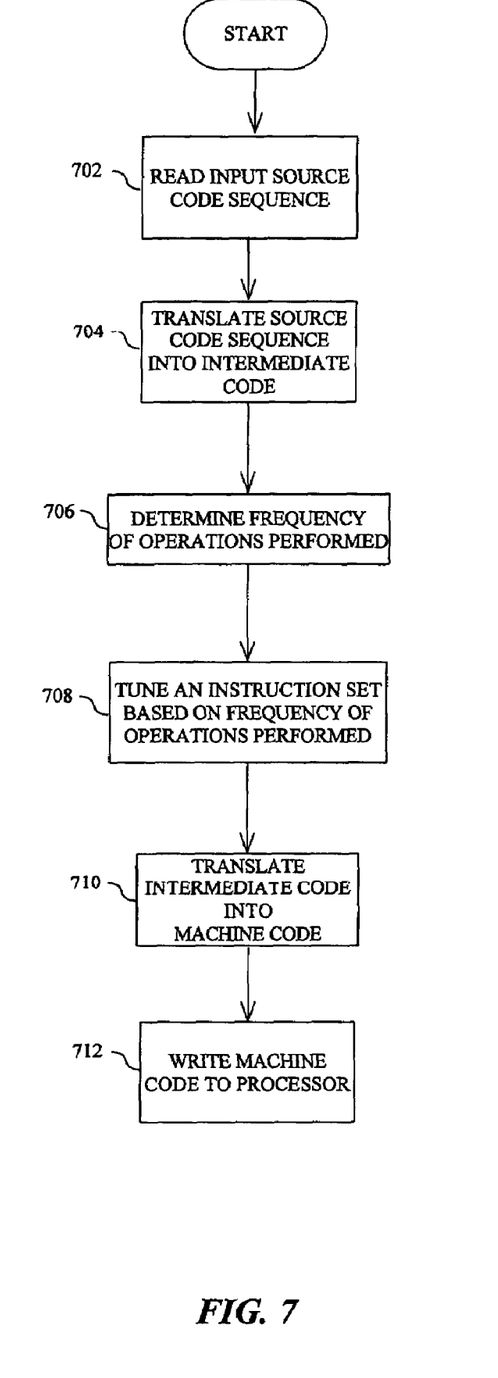
FIG. 7 is an illustration of the functional steps performed by an optimized machine code generator in accordance with an exemplary embodiment of the present invention.

Compiler programs may perform a variety of operations, as will be shown and described in FIG. 7. It is understood that the methods of optimization described in the following FIGS. 2 through 6 may be executed upon a code sequence after it has been read into the compiler and translated to an intermediate, or p-code. Following execution of the methods of optimization described in FIGS. 2 through 6 the compiler may then write the optimized code sequence to a processor or other machine code generator being employed by the system within which the compiler is executed. As exemplified in FIG. 1, the present invention may be executed upon stand-alone computing systems, alternatively the present invention may also be employed upon embedded computers, such as chips found in cars, home appliances, and the like.

Figure 2:
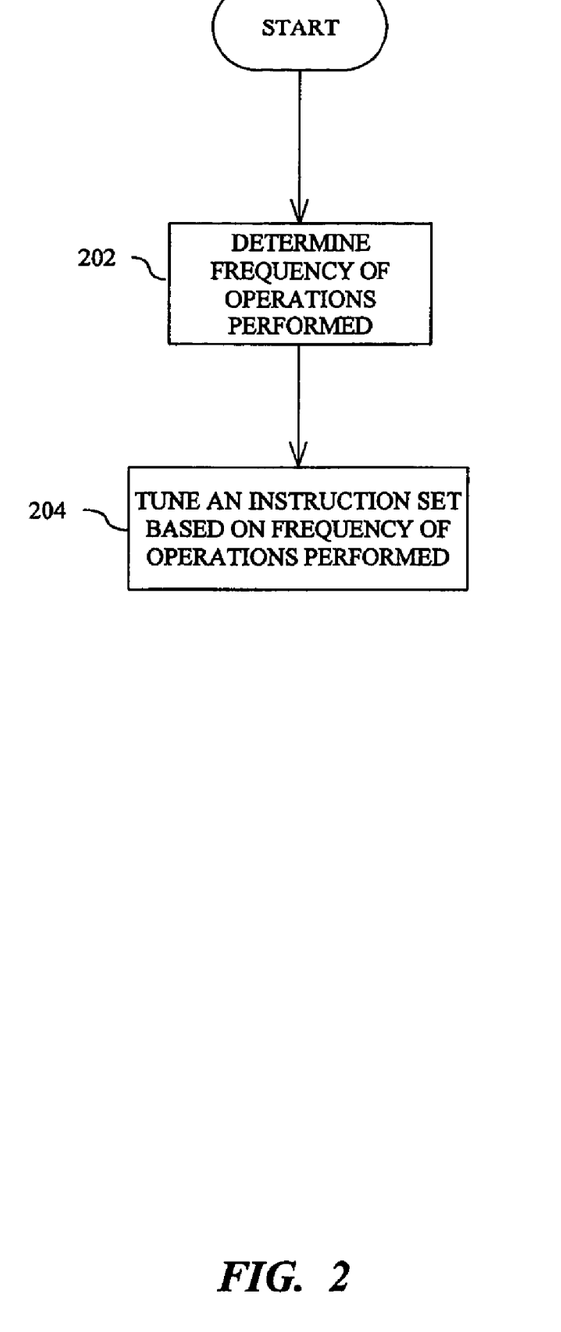
FIG. 2 is a diagrammatic representation of the functional steps performed by a first exemplary embodiment of the present invention.

In the embodiment shown in FIG. 2, the compiler, in step 202, determines the frequency of operations performed in the code sequence. The code sequence is initially provided as a source language of a specific program to be executed. The source language is translated into an intermediate code, called p-code. The compiler scans the p-code to develop a histogram representing the frequency of operations performed. After the determination of frequency of operation performed is complete, then the compiler uses this information, in step 204, to tune (a.k.a., modify) the instruction set by assigning an op-code representation to an instruction. Thus, the compiler provides a shorter op-code representation to those instructions which represent the most frequent operations. For example, in a very simple instruction set with only one register (e.g. an accumulator), a simple set of instructions might include:

TABLE 1

Sample Instruction Set

| | |
|---|---|
| Load from memory | 000 |
| Load immediate | 001 |
| Store to memory | 010 |
| Branch with offset | 011 |
| Shift Left | 100 |
| Shift Right | 101 |
| Add from Memory | 110 |
| Halt | 111 |

In this simple case, each instruction is represented by 3 bits followed by a number of bits representing a target or the like. In this simple case, all instruction might be 12 bits: 3 bits to represent the instruction (called the operation code or op-code) and 9 bits to represent the target. The average instruction size is logically 12 bits for this case such as the number of bits to shift or the like.

It is known that with modern processors there is a substantial penalty if the next sequential instruction of a instruction sequence is not found in the instruction cache (referred to as a cache miss). To reduce this penalty, instead of having fixed, 12-bit instructions, the instruction set is represented by the following bit patterns:

TABLE 2

Sample Instruction Set with Huffman-encoded op-codes

| | |
|---|---|
| Load from memory | 11 + offset (11 bits) |
| Load immediate | 01 + offset (11 bits) |
| Store to memory | 001 + offset (12 bits) |
| Branch with offset | 101 + offset (12 bits) |
| Shift Left | 0000 + offset (13 bits) |
| Shift Right | 1000 + offset (13 bits) |
| Add from Memory | 0001 + offset (13 bits) |
| Halt | 1001 + offset (13 bits) |

From this, if all instructions occurred in equal amounts, the resulting object code (machine code) is larger than that with fixed 12-bit instruction ($\frac{1}{8}*11+\frac{1}{8}*11+\frac{1}{8}*12+\frac{1}{8}*12+4*(\frac{1}{8}*13))=12.25$, meaning that the average instruction length is 12.25 bits. This encoding would not have any advantage unless it were known that certain instruction occurred more frequently than others. For example, if the two load instructions accounted for fifty percent of the instruction mix and the rest were distributed evenly, then the average instruction length would be ($\frac{1}{2}*11+\frac{1}{12}*12+\frac{1}{12}*12+4*(\frac{1}{12}*13))=11.83$. Thus, the average instruction size, at 11.83-bits, is now smaller than 12-bits. Therefore, with static information, the instruction set can be tuned to produce tighter code that takes up less space in memory, less space in the instruction cache, and the like.

The above instruction set representation, shown in Table-2, is a good choice if more than fifty percent of the instructions generated for a particular program/application were Load/Load immediate or the like. Assuming, that there is a program, that behaves in this way when compiled, with many loads, then a fewer number of adds and a fewer number of stores, no halts and very few branches, a machine code matching that of Table-2 would be more compact and hence provide improved performance.

In order to exemplify how the present invention further improves the ability to execute a program/application through use of Huffman-like encoding of op-code bit symbol representations, the following example is provided. It is contemplated that some program/application may perform a filter algorithm and require more use of the add (Add from Memory) and shift (Shift Left, Shift Right) operations or the like. If each instruction accounts for twenty-five percent of the instruction mix with the rest equally divided between the remaining five instructions, then using the encoding in Table-2 results in the following average instruction length: 25%*13+25%*13+25%*13+25%*(⅕*11+⅕*11+⅕*12+⅕*12+⅕*13)=12.7. The average instruction length is 12.7 which is greater than 12-bits and therefore this program/application does not run as efficiently as the application that mostly used the load instruction. This is one of the reasons the target program is analyzed to determine the optimal instruction set, either based on a static histogram of instructions or other methods that may better predict the mix of instructions that will be executed during program operation. Once the optimal instruction set is determined, the target computing environment is configured to execute the modified instruction set, the program is loaded and run.

New technology includes one or more processors with reconfigurable instruction sets. Such instruction sets may be changed so as to run programs having various source languages. Using the present invention a processor's instruction set(s) may be modified or tuned simply by modifying the representation of op-codes. In this architecture, the compiler, after it has performed an initial scan of the source code, determines which instruction will occur more frequently. Then, before generating the final object code, the compiler will design an instruction set that best suits the code to be generated. Therefore, when the present invention determines that seventy-five percent of the instructions to be generated are add/shift, the compiler may tune the instruction set as shown:

TABLE 3

Sample Instruction Set with Compiler-Modified Huffman-encoded op-codes

| Load from memory | 101 + offset (12 bits) |
| Load immediate | 1001 + offset (13 bits) |
| Store to memory | 0001 + offset (13 bits) |
| Branch with offset | 0000 + offset (13 bits) |
| Shift Left | 11 + offset (11 bits) |
| Shift Rights | 01 + offset (11 bits) |
| Add from Memory | 001 + offset (12 bits) |
| Halt | 1001 + offset (13 bits) |

For this instruction set, the same instruction mix would yield an average instruction length of: 25%*11+25%*11+25%*12+25%*(⅕*12+⅘*13)=11.7. By using the compiler of the present invention, the resulting code size may be reduced by two to three percent. This reduction in code size may require fewer fetches from main memory and reduction in the size of the code stored in the instruction cache, which may result in a reduction in the number of cache misses.

Figure 3:
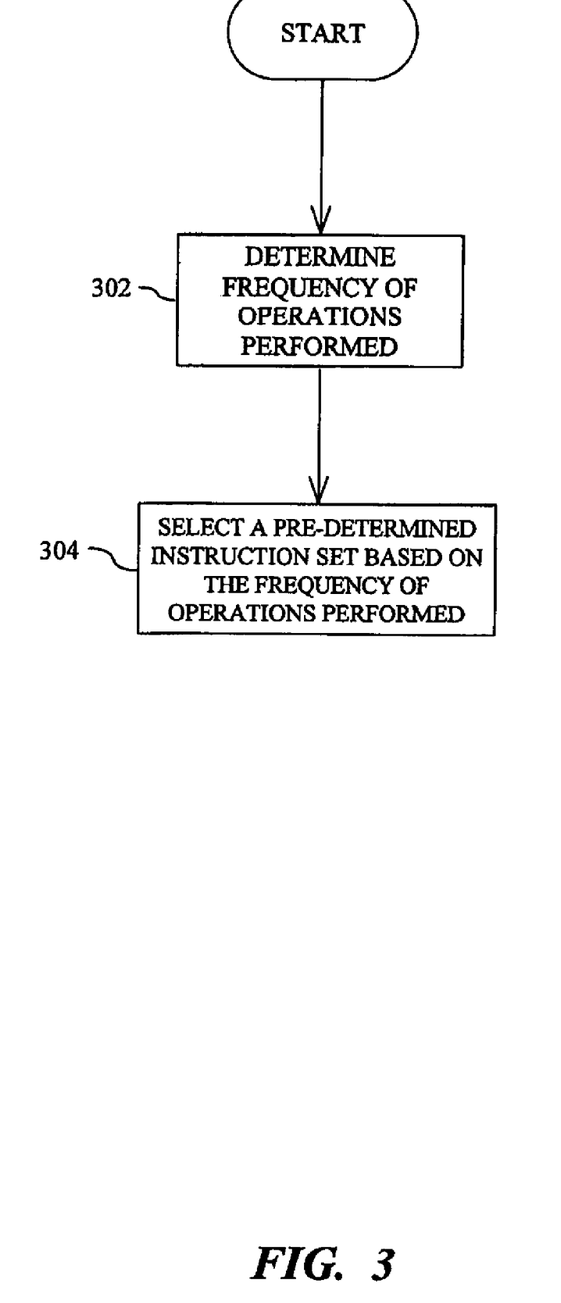
FIG. 3 is a diagrammatic representation of the functional steps performed by a second exemplary embodiment of the present invention.

In the exemplary method illustrated in FIG. 3, an alternative method of optimizing the representation of a code sequence is shown. It is contemplated that this method may be implemented via a compiler or other machine code generator similar to those described in FIG. 2. In step 302 the frequency of operations performed in a code sequence is determined. This determination may be accomplished through a scanning process, as described above for FIG. 2, wherein p-code is scanned for developing frequency distribution representing the frequency of operations performed by the code sequence.

In step 304 the compiler is enabled to select from among a plurality of pre-determined instruction sets based on the determined frequency of operations performed. The plurality of pre-determined instruction sets may have been generated through execution of the Huffman-encoding principles, as applied to the bit symbol representations of the instructions within the instruction set, as described previously under FIG. 2. One set might be optimized for math functions, one for Boolean functions, one for data movement and manipulation, one for input/output, and the like. It is contemplated that each of the pre-determined instruction sets may have been developed for use in the execution of various other programs/applications previously executed through the compiler of the present invention. It is further contemplated that the plurality of pre-determined instruction sets may be provided from a pre-programmed list stored in a memory location of the computer which is enabled with the compiler of the present invention.

For example, if many mathematical instructions are used in one program (e.g. multiply, divide, add), then the compiler may use a pre-determined instruction set that represents these instructions in a compact form, perhaps one byte. Little used instructions, such as shifts and moves, may be assigned less compact instructions, perhaps two or three bytes each. The resulting executable may have the definition of the instruction set pre-pended to it, or may have an optional value that is used to select the desired instruction set from a set of pre-determined instruction sets. The advantage of this method again is the improved resulting executable size and a reduced number of memory cycles required to execute a given program.

It is further contemplated, for the methods for optimizing the representation of a code sequence shown and described in FIGS. 2 and 3 (and in FIGS. 4 and 5 below), that additional optimization techniques, employed by compilers or other machine code generators, as contemplated by one of ordinary skill in the art may be employed. For example, compiler optimization techniques related to loop-analysis may be used to modify the histogram to take into account instructions that occur within loops that may get executed multiple times.

Figure 4:
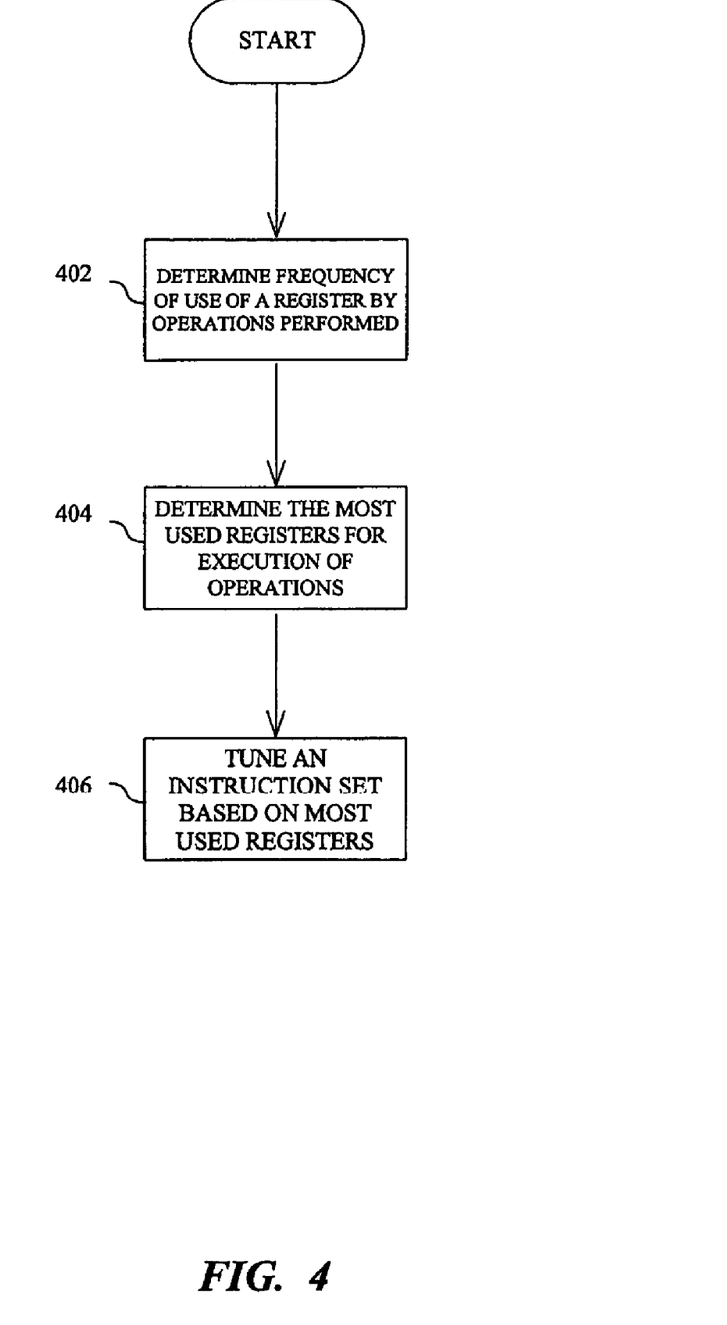
FIG. 4 is a diagrammatic representation of the functional steps performed by a third exemplary embodiment of the present invention.

Referring now to FIG. 4, another alternative method for optimizing the representation of a code sequence, is shown. This embodiment may be implemented using various machine code generators, such as a compiler and the like. In step 402, the compiler determines the frequency of use of a register by operations performed in the code sequence. In step 404, tuning of the instruction set occurs wherein the target-code representation of the register is based on the frequency of use of the register. Thus, the representation of registers within the instruction set may be enabled using the principles of the Huffman-encoding process discussed previously. For example, a reference to registers used more frequently may require two bits and a reference to registers used less frequently may require more than 4 bits.

Figure 5:
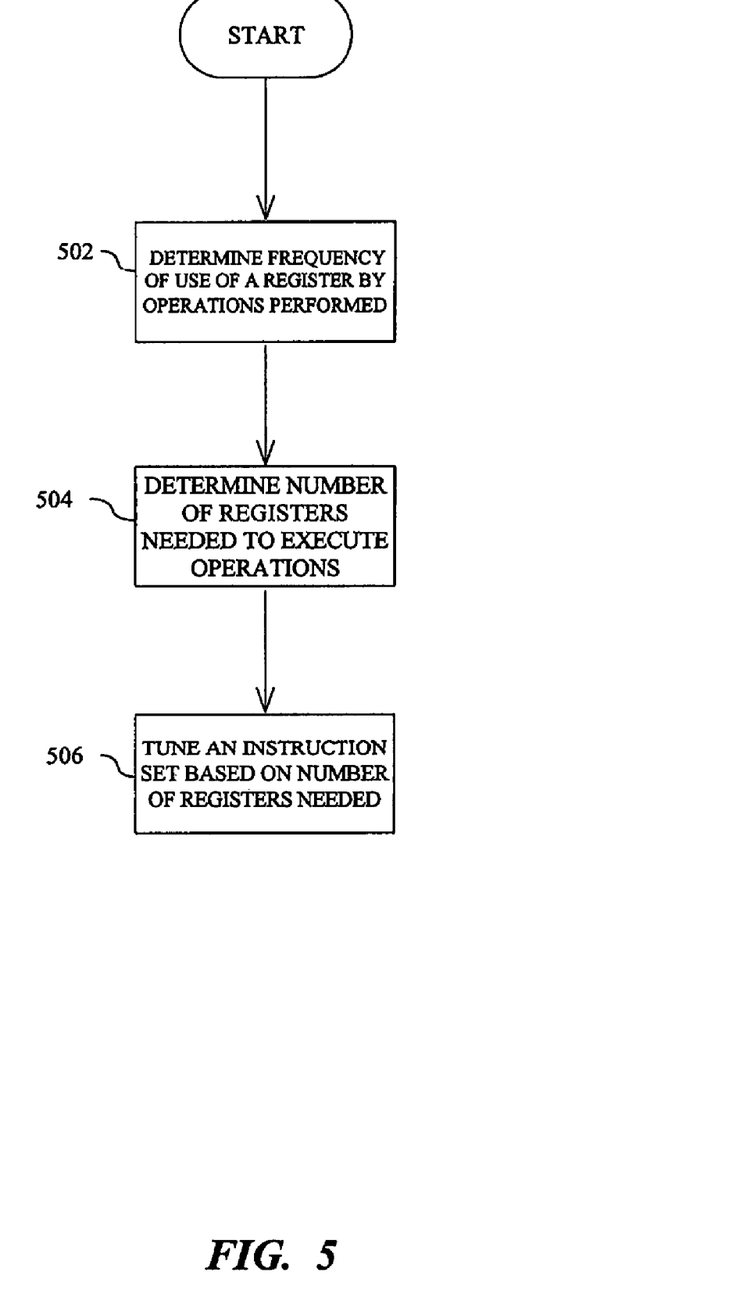
FIG. 5 is a diagrammatic representation of the functional steps performed by a fourth exemplary embodiment of the present invention.

In a still further alternative embodiment, FIG. 5 shows a method for optimizing the representation of a code sequence. The current embodiment may be implemented through various machine code generators, such as a compiler and the like. In step 502, the compiler determines the frequency of use of one or more registers within a plurality of registers by the operations performed in the code sequence. From this determination, step 504 limits the use of registers to one or more of the plurality of registers. In step 506, the instruction set is tuned based on the frequency of use of one or more of the plurality of registers and the assigned target-code representation is compacted. For example, in a system with 16 registers, if the compiler could generate tight code ninety-nine percent of the time using only 8 of the registers, then instructions may be tuned to use 3 bits to represent those 8 registers instead of 4 bits to represent 16 registers. In this example, if more than 8 registers are needed, the compiler may move a value stored in one of the 8 registers into temporary space or push it onto the stack, using that register to store an additional value.

It is understood that the number of registers within the systems contemplated by the exemplary embodiments illustrated in FIGS. 4 and 5 may vary without departing from the scope and spirit of the present invention. Thus, a system with 32, 64, 128, or more registers may have similar Huffman-encoding principles applied to it as that shown in the 16 register systems described previously. It is further contemplated that systems which employ various register architectures, such as virtual registers, and the like, shall be included within the scope of operation of the present invention.

Referring now to FIG. 6, a flowchart illustrating the functional steps performed by a fifth exemplary embodiment of the present invention is shown. In step 602 the frequency of operations performed is determined, in a manner, similar to the determination step as previously described in FIGS. 2 through 5. In step 604 the present invention determines which, if any, instructions are never executed within the program/application. For example, the present embodiment may determine that a halt or I/O instruction is never performed. In step 606 the instruction set is tuned to an optimized arrangement, using similar Huffman-encoding principles as described previously in FIGS. 2 through 5, based on the determined frequency of operations and the determined instructions needed. Thus, the current embodiment optimizes bit symbol representations of instructions and also optimizes the list of instructions within the instruction set by reserving bit-pattern representations for only those instructions which are used by a program, application, or the like.

A schematic representation of an optimized machine code generator, including computer readable code for optimizing a code sequence, is shown in FIG. 7. In this schematic representation, the optimized machine code generator may include a first read executable for reading a source code sequence, step 702. The first read executable may be operationally coupled with a first translation executable 704 for translating the source code sequence into an intermediate code, or p-code. A scanning executable may then be employed by the optimized machine code generator which provides a histogram representation of the frequency of operations to be performed, as identified from the source code sequence, step 706. An optimizing translation executable may then tune/modify an instruction set, step 708. This tuning includes modifying a bit symbol representation of an op-code of an instructions within the instruction set, wherein the shortest bit symbol representation is given to the most frequently used instruction and a longer bit symbol representation is given to a less frequently used instruction. This assigning of variable length bit symbol representations is based on the determined frequency of operations performed by the code sequence. The optimized code is then translated into object code (machine code) in step 710, which is then output to the processor through a write executable, in step 712.

It is understood that alternative embodiments of the optimized machine code generator are contemplated to perform optimization in accordance with the methods described previously in FIGS. 3 through 5. As such, it is further contemplated that additional executables may be added and existing executables may be removed from the optimized machine code generator.

In the embodiments described in FIGS. 2 through 5 it is understood that the present invention may be employed with systems comprising either constant or variable length instruction sets. For example, in such systems, some instructions may be n-bits long, some instructions may be n'-bits long, and some instructions may be n''-bits long.

The present invention may be a loadable micro-code including a first and second executable. Thus, while previous embodiments have been exemplified as already contained within a defined system, it is understood that the present invention may be loaded from an external source. The loadable micro-code includes the first executable which provides the ability to determine the frequency of operations performed in a code sequence. As described previously, this is a first step to the creation of an optimized instruction set. The micro-code further includes a second executable which tunes the instruction set for assigning an op-code representation to an instruction based on the frequency of operations performed in a code sequence. Other executables may be included on the micro-code, such as loop-analysis techniques, and the like, without departing from the scope and spirit of the present invention.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes. Furthermore, the examples show methods of determining an optimal instruction set, then generating object code based on that instruction set. Prior to executing the resulting object code, the computing environment need be reconfigured to be capable of recognizing and decoding the modified instruction set.

What is claimed is:

1. A method for optimizing a code sequence, comprising:
scanning the code sequence to determine a static frequency of operations performed in the code sequence;
determining an executed frequency of operations within multiple times executed loops for the code sequence;
providing a representation of operation frequency, which represents the static frequency of operations and the executed frequency of operations, the representation of operation frequency being a frequency distribution;
tuning an instruction set for assigning an op-code representation to an instruction,
wherein the tuning of the instruction set is based on the representation of operation frequency, which represents the static frequency of operations and the executed frequency of operations; and
wherein the optimization of the code sequence may be executed by a microcode loadable from an external source.

2. The method of claim 1, wherein the representation of a code sequence is a bit symbol representation.

3. The method of claim 1, wherein the instruction set is a variable length instruction set.

4. The method of claim 1, wherein the instruction set is a constant length instruction set.

5. The method of claim 1, wherein the frequency distribution is a histogram.

6. The method of claim 1, wherein a more compact version of the code sequence is accomplished through shortening of bit symbol representation of an op-code of the instruction set.

7. A method for optimizing a code sequence, comprising:
   determining a frequency of operations performed in the code sequence;
   providing a representation of operation frequency, which represents the frequency of operations, the representation of operation frequency being a frequency distribution;
   providing a plurality of pre-determined instruction sets with each pre-determined instruction set comprising instructions including assigned op-code representations, each pre-determined instruction set being optimized for a frequency of a particular operation;
   wherein the frequency of the particular operation includes an executed frequency of operations within multiple times executed loops for the code sequence;
   selecting one of the plurality of pre-determined instruction sets based on the determined frequency of operations performed in the source sequence; and
   wherein the optimizing the code sequence may be executed by a microcode loadable from an external source.

8. The method of claim 7, wherein the representation of a code sequence is a bit symbol representation.

9. The method of claim 7, wherein the instruction set is a variable length instruction set.

10. The method of claim 7, wherein the instruction set is a constant length instruction set.

11. The method of claim 7, wherein the frequency distribution is a histogram.

12. The method of claim 7, wherein a more compact version of the code sequence is accomplished through shortening of bit symbol representation of an op-code of the instruction set.

13. A method for optimizing a code sequence, comprising:
   determining a frequency of use of a register based on scanning the code sequence to determine a static frequency of operations in the code sequence;
   modifying the static frequency of operations by analyzing multiple time executed loops to determine an executed frequency of operations in the register for said code sequence;
   providing a representation of operation frequency, which represents the static frequency of operations and the executed frequency of operations, the representation of operation frequency being a frequency distribution;
   tuning an instruction set for assigning a target-code representation for the register,
   wherein the tuning of the instruction set is based on the frequency of use of the register,
   wherein the tuning of the instruction set is based on the representation of operation frequency, which represents the static frequency of operations and the executed frequency of operations for said register; and
   wherein the optimizing the code sequence may be executed by a microcode loadable from an external source.

14. The method of claim 13, wherein the representation of a code sequence is a bit symbol representation.

15. The method of claim 13, wherein the instruction set is a variable length instruction set.

16. The method of claim 13, wherein the instruction set is a constant length instruction set.

17. The method of claim 13, wherein the frequency distribution is a histogram.

18. A method for optimizing a code sequence, comprising:
   determining frequency of use of one or more registers within a plurality registers by the operations performed in the code sequence;
   providing a representation of operation frequency, which represents the frequency of operations, the representation of operation frequency being a frequency distribution;
   wherein the frequency of operations includes an executed frequency of operations within multiple times executed loops for the code sequence;
   determining number of registers needed to execute operations;
   tuning the instruction set for assigning a target-code representation for one or more of the plurality of registers,
   wherein the tuning the instruction set is based on the frequency of use of the plurality of registers and the number of registers needed to executed operations; and
   wherein the optimizing the code sequence may be executed by a microcode loadable from an external source.

19. The method of claim 18, wherein the representation of a code sequence is a bit symbol representation.

20. The method of claim 18, wherein the instruction set is a variable length instruction set.

21. The method of claim 18, wherein the instruction set is a constant length instruction set.

22. The method of claim 18, wherein the frequency distribution is a histogram.

23. A computer readable medium upon which is stored computer readable code for optimizing a code sequence, wherein said computer readable code upon being executed on a computer causes steps comprising:
   scanning the code sequence to determine a static frequency of operations in the code sequence;
   determining an executed frequency of operations within multiple times executed loops for the code sequence;
   providing a representation of operation frequency, which represents the static frequency of operations and the executed frequency of operations, the representation of operation frequency being a frequency distribution; and
   tuning an instruction set for assigning an op-code representation to an instruction,
   wherein the tuning of the instruction set is based on the representation of operation frequency, which represents the static frequency of operations and the executed frequency of operations; and
   wherein the optimizing of the code sequence may be executed by a microcode loadable from an external source.

24. The computer readable medium of claim 23, wherein the representation of a code sequence is a bit symbol representation.

25. The computer readable medium of claim 23, wherein the instruction set is a variable length instruction set.

26. The computer readable medium of claim 23, wherein the instruction set is a constant length instruction set.

27. The computer readable medium of claim 23, wherein the frequency distribution is a histogram.

28. An optimized computing assembly, comprising:
   a processor coupled with a memory for executing programs; and
   an optimized code generator operationally coupled with the processor and the memory, the optimized code generator for scanning a code sequence to determine a static frequency of operations in the code sequence, for determining an executed frequency of operations within multiple times executed loops for the code sequence, for providing a representation of operation frequency, which represents the static frequency of operations and the executed frequency of operations, the representation of operation frequency being a frequency distribution; and for tuning an instruction set by assigning an op-code representation selected according to the executed frequency of operations to an instruction, wherein the tuning of the instruction set is based on the representation of operation frequency, which represents the static frequency of operations and the executed frequency of operations, and wherein the optimization of the code sequence may be executed by a microcode loadable from an external source.

29. The optimized computing assembly of claim 28, wherein the representation of a code sequence is a bit symbol representation.

30. The optimized computing assembly of claim 28, wherein the instruction set is a variable length instruction set.

31. The optimized computing assembly of claim 28, wherein the instruction set is a constant length instruction set.

32. The optimized computing assembly of claim 28, wherein the frequency distribution is a histogram.

33. An optimized code generator for generating a source code stored on a computer readable medium and configured to be executed by a computer, comprising:

a read executable for reading the source code;

a translation executable operationally coupled with the read executable, the translation executable for translating the source code to an intermediate code;

a scanning executable operationally coupled with the translation executable, the scanning executable for determining a static frequency of operations and an executed frequency of operations by analyzing loops performed by the source code and providing a representation based on the static frequency of operations and the executed frequency of operations, the representation of operation frequency being a frequency distribution;

an optimizing translation executable operationally coupled with the scanning executable, the optimizing translation executable for translating the intermediate code to an object code including an optimized instruction set based on the static frequency of operations and the executed frequency of operations;

wherein the optimizing translation may be executed by a microcode loadable from an external source; and a write executable operationally coupled with the optimizing translation executable, the write executable for outputting an optimized object code.

34. The optimized code generator of claim 33, comprising a compiler.

35. The optimized code generator of claim 33, comprising an assembler.

36. The optimized code generator of claim 33, wherein the instruction set is a variable length instruction set.

37. The optimized code generator of claim 33, wherein the instruction set is a constant length instruction set.

38. The optimized code generator of claim 33, wherein the frequency distribution is a histogram.

39. An optimized code generator for generating a source code stored on a computer readable medium and configured to be executed by a computer, comprising:

means for scanning the code sequence to determine a static frequency of operations in a code sequence;

means for determining an executed frequency of operations within multiple times executed loops for the code sequence;

means for providing a representation of operation frequency, which represents the static frequency of operations and the executed frequency of operations, the representation of operation frequency being a frequency distribution; and means for tuning an instruction set by selecting an op-code representation from a plurality of pre-determined sets to an instruction, wherein the tuning of the instruction set is based on the representation of operation frequency, which represents the static frequency of operations and the executed frequency of operations, wherein the generating the source code may be executed by a microcode loadable from an external source.

40. The optimized code generator of claim 39, comprising a compiler.

41. The optimized code generator of claim 39, comprising an assembler.

42. The optimized code generator of claim 39, wherein the instruction set is a variable length instruction set.

43. The optimized code generator of claim 39, wherein the instruction set is a constant length instruction set.

44. The optimized code generator of claim 39, wherein the frequency distribution is a histogram.

* * * * *